(No Model.) 2 Sheets—Sheet 1.
G. KIMBALL.
WHEEL PLOW.
No. 404,716. Patented June 4, 1889.
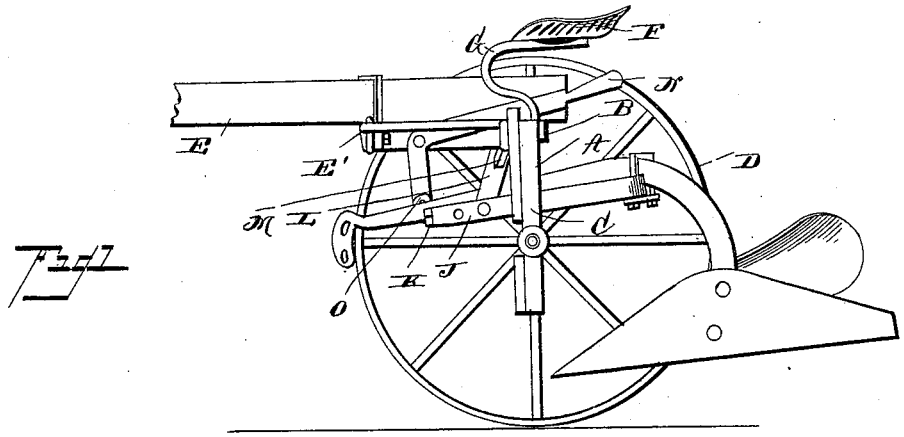
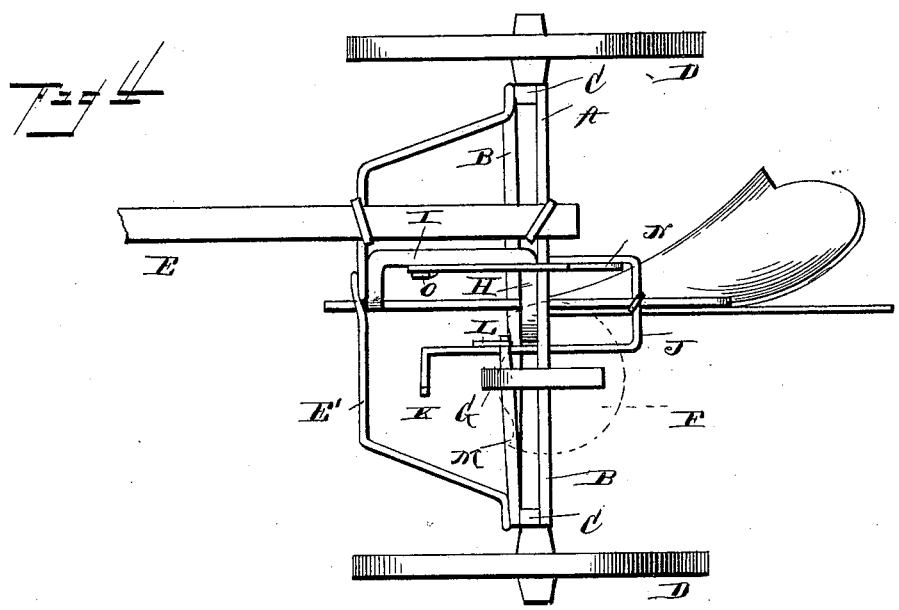
Witnesses
John Imirie
R. W. Bishop.
Inventor
George Kimball
By his Attorneys (No Model.) 2 Sheets—Sheet 2.
G. KIMBALL.
WHEEL PLOW.
No. 404,716. Patented June 4, 1889.
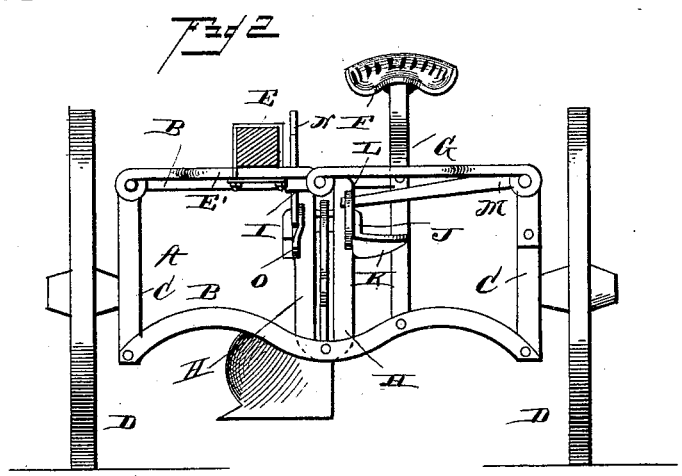
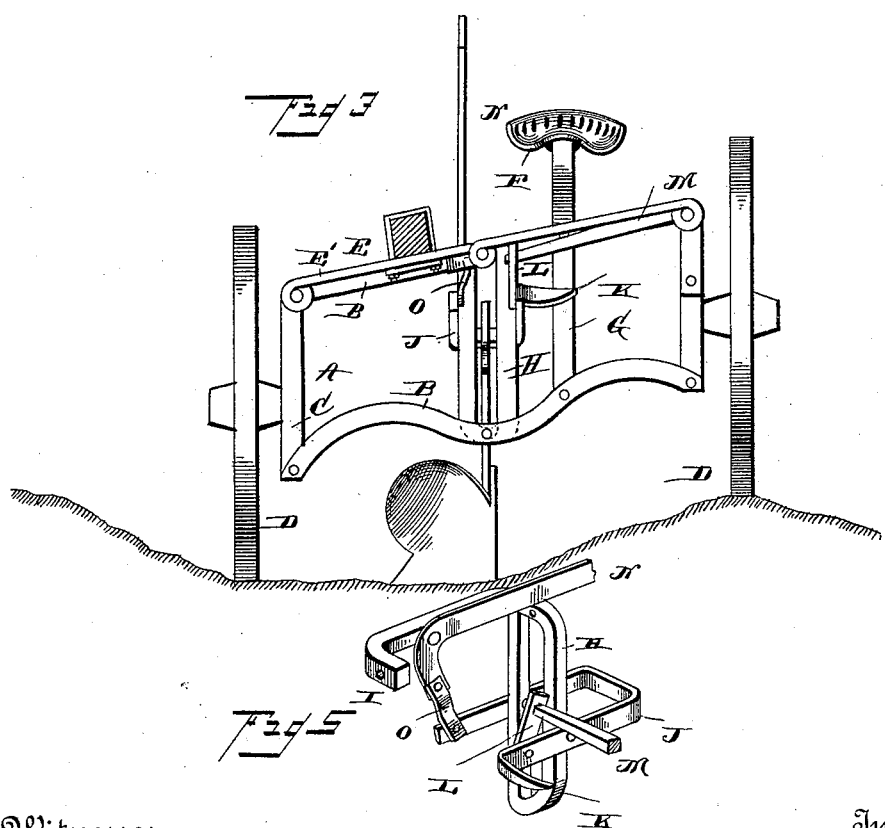
Witnesses
John Imirie
R. W. Bishop
Inventor
George Kimball
By his Attorneys

UNITED STATES PATENT OFFICE.

GEORGE KIMBALL, OF LAWRENCE, KANSAS.

WHEEL-PLOW.

SPECIFICATION forming part of Letters Patent No. 404,716, dated June 4, 1889.

Application filed January 22, 1889. Serial No. 297,121. (No model.)

*To all whom it may concern:*

Be it known that I, GEORGE KIMBALL, a citizen of the United States, residing at Lawrence, in the county of Douglas and State of Kansas, have invented new and useful Improvements in Wheeled Plows, of which the following is a specification.

My invention relates to improvements in wheeled plows, and has for its object the production of a wheeled plow which will automatically adjust itself to the difference between the bottom of the furrow and the surface of the unplowed ground, so that the wheels will always be perpendicular, and the driver's seat will be always maintained in a level position without entailing a great amount of labor on the driver. This object I accomplish by the peculiar construction of the plow-frame; and my invention consists in certain novel features of this construction, which will be hereinafter first fully described, and then pointed out in the claims.

In the accompanying drawings, Figure 1 is a side view of my improved plow with the near wheel removed. Fig. 2 is a front view. Fig. 3 is a similar view showing the device arranged to allow one wheel to move along the furrow and the other wheel to move along the unplowed ground. Fig. 4 is a plan view. Fig. 5 is a detail view in perspective of a part of the operating mechanism of my improved plow.

Referring to the drawings by letter, A designates the main frame, composed of the horizontal bars B B, and the vertical bars C C, forming substantially a parallelogram. The ends of the end bars are pivoted to the ends of the horizontal bars, and the wheels D D are mounted on spindles projecting from the said vertical bars. The tongue E is secured at its rear end to the upper horizontal bar B and projects forward therefrom, being secured to and resting on a yoke E', secured to the upper ends of the vertical bars C. The ends of this yoke are pivoted to the upper ends of the vertical bars, so as to move in unison with the upper horizontal bar B, so as to prevent binding of the parts in adjusting the plow. The driver's seat F is secured to the upper end of a standard G, which is pivoted at its lower end to the lower horizontal bar B and is pivoted near its upper end to the upper horizontal bar B, as shown.

H designates a slotted supporting-arm, which is pivoted at its lower end to the lower horizontal bar B and at its upper end to the upper horizontal bar B, and is provided with the forwardly-projecting branch I, the end of which is pivoted to the yoke E'.

J designates a yoke which is pivoted to the sides of the slotted supporting-arm H and to which the plow-beam is secured, the said beam projecting forward through the slot in the arm H. One end of the yoke J is bent laterally to form a pedal or foot-rest K, so that the plow can be raised or lowered by the foot of the operator. The yoke J is also connected by means of a link L with the inner end of an arm M, which is rigidly secured to one of the vertical bars of the frame, so that as the plow is raised or lowered the frame may be moved to adjust the driver's seat.

In order that the plow may be raised or lowered by hand, if so desired, I provide the bent lever N, which is pivoted on the branch I of the supporting-arm H and is connected by a link O with the yoke J.

Draft is applied to my improved plow and it is drawn over the ground in the usual manner. When the plow is lowered so as to take into the ground, the arm M will be thrown toward the adjacent wheel, and being rigidly secured to the vertical bar of the frame will cause the same to move simultaneously, and consequently give the horizontal bars movement in contrary directions and cause the frame to assume the position shown in Fig. 3, as will be readily understood. When the plow is raised the several parts will be moved in the reverse direction and the frame will assume the position shown in Fig. 2. As the plow is drawn along the field the irregularities in the surface of the ground will cause one wheel to rise at the same time that the other one is lowered, and thereby automatically move the bars composing the frame of the machine, so as to keep the driver's seat level at all times, and as the end bars are always perpendicular the wheels carried thereby will be always vertical.

From the foregoing description, taken in connection with the accompanying drawings, it will be seen that I have provided a very effective plow in which only one lever is used, so that it can be adjusted for work with very little effort.

My improved plow is composed of few parts, so that it takes up no unnecessary room, and at the same time possesses the requisite strength and durability.

Having thus described my invention, what I claim, and desire to secure by Letters Patent, is—

1. The combination of the horizontal bars B B, the vertical end bars C C, having their ends pivoted to the ends of the horizontal bars, the spindles projecting from the end bars, and the seat-supporting standard pivoted at its lower end to the lower horizontal bar B and at an intermediate point of its height to the upper horizontal bar B, as set forth.

2. The combination of the horizontal bars B B and the vertical bars C C, having their ends pivoted together, the slotted supporting-arm H, pivoted to the horizontal bars B, and the yoke J, pivoted to the said arm H, the plow-beam being secured to the yoke J and projecting through the arm H, as set forth.

3. The combination of the horizontal bars B and the vertical bars C, having their ends pivoted together, the yoke E', pivoted to the bars C and supporting the tongue, the slotted supporting-arm H, pivoted to the bars B and having a forwardly-projecting branch I, pivoted to the yoke E', and the yoke J, pivoted to the arm H, the plow-beam being secured to the yoke J and projecting through the arm H, as set forth.

4. The combination of the horizontal bars B and the vertical bars C, having their ends pivoted together, the slotted arm H, pivoted to the bars B, the yoke J, pivoted to said arm H, the arm M, secured rigidly to one of the bars C, and the link L, connecting said arm with the yoke J, as set forth.

5. The combination of the bars B C, having their ends pivoted together, the arm H, pivoted to the bars B and having a forwardly-projecting branch I, the yoke J, pivoted to the arm H, the bent lever N, pivoted on the branch I of the arm H, and the link O, connecting said lever with the yoke J, as set forth.

In testimony that I claim the foregoing as my own I have hereto affixed my signature in presence of two witnesses.

GEORGE KIMBALL.

Witnesses:
GEO. W. HACKMAN,
J. C. CLAYPOOL.